US008935091B2

(12) United States Patent
Davis

(10) Patent No.: US 8,935,091 B2
(45) Date of Patent: Jan. 13, 2015

(54) METHOD AND APPARATUS FOR CREATING VISUAL EFFECTS ON GRASS

(76) Inventor: Pete J. Davis, Pleasanton, CA (US)

( * ) Notice: Subject to any disclaimer, the term of this patent is extended or adjusted under 35 U.S.C. 154(b) by 417 days.

(21) Appl. No.: 13/481,385

(22) Filed: May 25, 2012

(65) Prior Publication Data

US 2012/0253613 A1 Oct. 4, 2012

Related U.S. Application Data

(63) Continuation-in-part of application No. 11/842,654, filed on Aug. 21, 2007, now Pat. No. 8,190,360.

(51) Int. Cl.

*G01C 21/00* (2006.01)
*B44C 1/22* (2006.01)
*B44C 3/00* (2006.01)

(52) U.S. Cl.

CPC .. *B44C 1/222* (2013.01); *B44C 3/00* (2013.01)
USPC ............... 701/412; 701/400; 701/23; 701/50; 427/137; 705/14.4; 705/500; 404/93; 347/110; 347/111

(58) Field of Classification Search

USPC ...................... 701/23, 50, 400, 412; 427/137; 705/14.4, 500; 404/84.05, 93, 94; 347/110, 111
See application file for complete search history.

(56) References Cited

U.S. PATENT DOCUMENTS

| | | | |
|---|---|---|---|
| 4,919,224 | A | 4/1990 | Shyu et al. |
| 5,119,744 | A | 6/1992 | Comer |
| 5,540,516 | A | 7/1996 | Nicodemo et al. |
| 5,605,105 | A | 2/1997 | Clark et al. |
| 5,974,347 | A | 10/1999 | Nelson |
| 6,074,693 | A | 6/2000 | Manning |
| 6,650,975 | B2 | 11/2003 | Ruffner |
| 7,029,199 | B2 | 4/2006 | Mayfield et al. |
| 7,806,049 | B2 | 10/2010 | Fields et al. |
| 2003/0168834 | A1 | 9/2003 | Ulrich |
| 2004/0057795 | A1 | 3/2004 | Mayfield et al. |
| 2004/0200082 | A1 | 10/2004 | Dinicola |
| 2004/0233242 | A1 | 11/2004 | Patton et al. |
| 2005/0055142 | A1 | 3/2005 | Mcmurtry et al. |
| 2005/0075785 | A1 | 4/2005 | Gray et al. |
| 2005/0164023 | A1 | 7/2005 | Davis et al. |
| 2005/0165521 | A1 | 7/2005 | Gruhn |
| 2006/0059880 | A1 | 3/2006 | Angott |
| 2007/0198159 | A1 | 8/2007 | Durkos et al. |
| 2008/0047444 | A1 | 2/2008 | Fields et al. |
| 2008/0289310 | A1 | 11/2008 | Hagen et al. |
| 2009/0228166 | A1 | 9/2009 | Durkos et al. |
| 2010/0030709 | A1 | 2/2010 | Carr |

*Primary Examiner* — Khoi Tran
*Assistant Examiner* — Jaime Figueroa

(57) ABSTRACT

High resolution images are imprinted onto precise and consistent lawns and fields by use in combination of a global positioning system; a processor for generating a desired pattern which is translated into patterning instructions; and a patterning implement which is used for generating detailed patterns and for imprinting said patterns on any of natural or artificial lawns and fields, covered areas, and landscapes.

31 Claims, 8 Drawing Sheets

METHOD AND APPARATUS FOR CREATING VISUAL EFFECTS ON GRASS

CROSS REFERENCE TO RELATED APPLICATIONS

This application is a continuation-in-part of U.S. patent application Ser. No. 11/842,654, filed Aug. 21, 2007, now U.S. Pat. No. 8,190,360 which is currently allowed, which application is incorporated herein in its entirety by this reference thereto.

BACKGROUND OF THE INVENTION

1. Field of the Invention

The invention relates to a method and apparatus for imprinting high resolution images onto natural or artificial lawns and fields, covered areas such as sports fields, and landscapes, for example to provide a new or enhanced media for marketing, advertising, and beautification.

2. Discussion of the Prior Art

Certain types of lawn patterning techniques have been used in the past to enhance the visual characteristics of sports fields, and commercial and residential landscapes. These patterning techniques are produced with lawn maintenance equipment, such as mowers that are piloted by grounds keepers. The state of the art has heretofore not allowed for the creation of precise, consistent, and repeatable patterns. Thus, the conception and execution of a patterning procedure has been more art than science, and the outcome of the pattern has thus been largely dependent upon the operator's skill and the characteristics of the equipment used to implement the design.

Current equipment, such as tractors fitted with multi-implement mowers, are designed for efficiency, cutting, or patterning wide swaths of lawn and turf. Attempts to produce improved detail have been limited by the equipment's fixed width and lack of ability to create details or contrast with any degree of precision.

One limitation of the prior art is that the quality of patterning depends on how precisely the operator is able to guide the equipment. Thus, to create accurate imagery the operator must make careful use of local land marks when operating any patterning equipment. The quality of the patterning often suffers from accumulated ranging errors. Further degradation occurs as the patterning area increases and when there is an absence of line-of-sight feedback to the operator.

Thus, existing lawn and turf maintenance equipment and operations used to produce patterns do not have sufficient resolution and precision to produce highly detailed artwork, such as pictures, corporate logos, and script.

SUMMARY OF THE INVENTION

A method and apparatus for imprinting high resolution images onto fields, such as sports fields and landscapes is disclosed. In one embodiment, precise and consistent lawn and field patterning is accomplished by use in combination of a global positioning system; a processor for generating a desired pattern which is translated into patterning instructions; and a patterning implement which is used for generating detailed patterns and for imprinting said patterns on any of natural or artificial lawns and fields, covered areas, and landscapes. The patterning implement comprises a plurality of independent printing mechanisms incorporated within said patterning implement, each of the independent printing mechanisms coupled to receive patterning instructions from the processor and operate selectively in response thereto. The invention also comprises means for guiding the patterning implement to position it along a desired path at least in part with information from said global positioning system; and means for individually controlling each of said independent printing mechanisms incorporated within said patterning implement responsive to said patterning instructions and in coordination with positioning of said patterning implement along said desired path.

Accordingly, the invention generates detailed images and imprints these images on natural or artificial lawns and fields, covered areas such as sports fields, and landscapes. As a result, images imprinted on such surfaces in accordance with the invention, have a high degree of resolution and contrast, such that they are readily used as a medium for marketing products, general advertising, and artistic beautification.

One embodiment of the invention creates increased pattern resolution and contrast by controlling independent printing mechanisms incorporated within the patterning implements. For example, by significantly reducing the minimum image feature width, the invention adds detail to the patterns that are used to form the images. Current equipment and practices of patterning produce a continuous effect along the length of the equipment path. The invention described herein supplies much improved contrast and detail, and also reduces the size of the attainable details within a pattern. This eliminates several shortcomings in the current state of the art, and provides expanded equipment capability.

One embodiment of the invention uses specialized lawn and field equipment that is known to provide sufficient resolution and that has the potential to produce highly detailed features. This invention exploits the full potential of such equipment by eliminating the operator as a variable during creation and imprinting of the pattern. Thus, in the invention patterns are translated into instructions which operate a computer or other device. Individual patterning implements receive and react to these instructions. Patterning errors are reduced by using equipment position tracking and guidance systems. One embodiment of the invention provides mechanical hardware, software, and processes that control the above effects to produce visual contrast, and thus efficiently and accurately imprint highly detailed images onto lawns, grass, or turf fields.

Another embodiment of the invention provides a method and apparatus that creates high resolution images on any field. In this embodiment, images are made visible by changing defined areas of lawn or turf within the boundary of the image. Effects can include:

1) Bending individual blades of turf to create a desired change in refractive properties of the turf at specific locations to impart a pattern or image to the turf;

2) Controlling the length of individual blades of the turf to expose color stratifications; and 3) Applying color altering media to the turf.

The patterning equipment described above is impelled by a mechanical means along the turf, for example by towing the patterning equipment with a tractor. The patterning equipment can comprise, for example, grass cutting or bending implements. Typical grass cutting means include, e.g. spinning blades, and grass bending means include, e.g. rollers. High resolution patterning of the turf is obtained by automating the action of the individual implements. In a manner similar to that of a dot matrix printer, individual pixels or contrast swaths are imprinted onto a turf using this technique. Although simple, this computer controlled dot matrix approach is far superior to the current low-resolution system where the skill of the operator controls the quality of the pattern.

Features created by altering the height of the grass with specialized cutting or mowing equipment provide enhanced analog qualities to the more basic dot-matrix concept. Variations in pattern contrast can be used to produce smooth gradients along the length of the patterned feature. The resolution of the pattern can be increased by varying the contrast intensity across the width of the imprinted swath. The patterning equipment can include an onboard computer. Based on field position, signals processed by the on-board computer can control the effect that each implement has on the turf. The number of grass cutting or bending implements can vary from one to many.

Uses of the invention include the creation and presentation of marketing and advertising imagery on sports fields and landscapes. Current low resolution approaches are not capable of imprinting such images. Using the invention, corporate information, such as logos, script, and stylization can be printed onto any field including, for example, sports fields, freeway landscapes, and landscapes around airports and hillsides. Because imprinted imagery is intended for viewing, possible loss of image quality through angular view distortion is minimized by use of computer rendering to skew the artwork and thus enhance the image for optimal viewing from a defined viewing angle. For example, artwork intended for still camera capture or telecast can be distorted to provide the correct aspect ratio and keystone correction for a defined camera angle.

The imprinting processes disclosed herein can provide entertainment as well. For example, the dynamic qualities of the field printing process can be entertaining for spectators during pre-event seating and intermission. Computer generated programs can be used to control the imprinting of the field in an arranged sequence, thus providing a strategically orchestrated, paced unveiling of the image. Further, the invention makes it possible to imprint multiple layers by dividing-up artistic components and imprinting them sequentially. For example, a first layer may contain a base, while subsequent layers provide sequences of higher detail.

DETAILED DESCRIPTION OF A PREFERRED EMBODIMENT

A method and apparatus for imprinting high resolution images onto fields, such as sports fields and landscapes is disclosed. In one embodiment, precise and consistent lawn and field patterning is accomplished by use in combination of a global positioning system; a processor for generating a desired pattern which is translated into patterning instructions; and a patterning implement which is used for generating detailed patterns and for imprinting said patterns on any of natural or artificial lawns and fields, covered areas, and landscapes. The patterning implement comprises a plurality of independent printing mechanisms incorporated within said patterning implement, each of the independent printing mechanisms coupled to receive patterning instructions from the processor and operate selectively in response thereto. The invention also comprises means for guiding the patterning implement to position it along a desired path at least in part with information from said global positioning system; and means for individually controlling each of said independent printing mechanisms incorporated within said patterning implement responsive to said patterning instructions and in coordination with positioning of said patterning implement along said desired path.

Overall System

Figure 1:
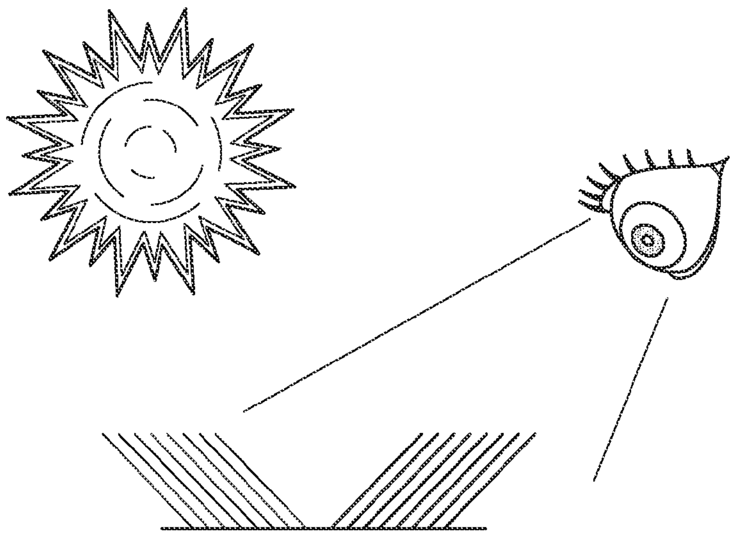
FIG. 1 is an image showing the relationship between individual blade angles, viewing perspective, and a light source according to the invention.
Figure 2:
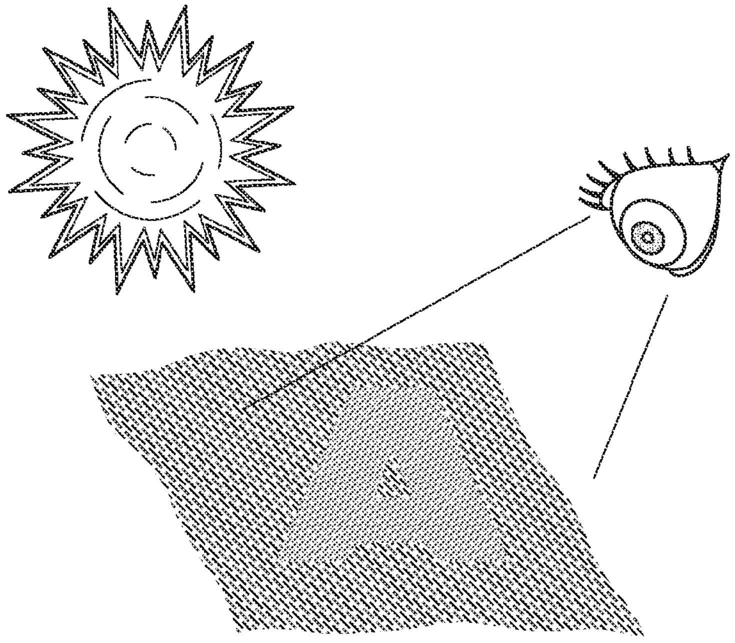
FIG. 2 is an isometric representation showing how the affected turf appears when it is viewed from a distinct position according to the invention.
Figure 3:
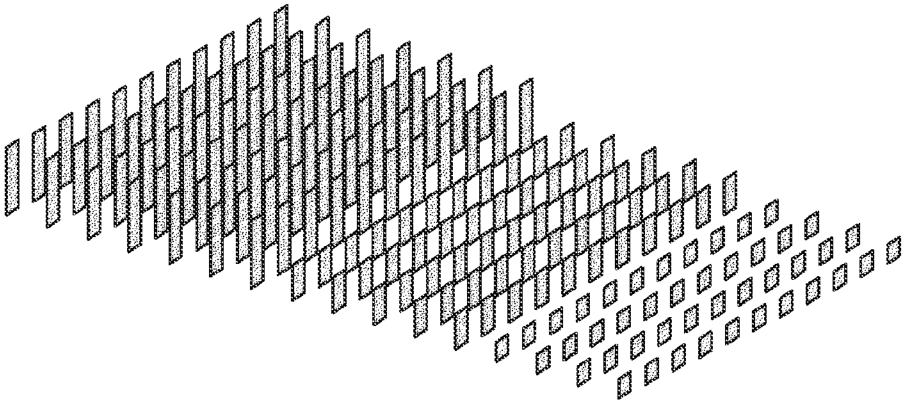
FIG. 3 is an image showing how contrast can be generated by changing the height of the turf according to the invention.

The invention provides a method and apparatus of perturbing turf to change its visual appearance (FIG. 1). The elements of a presently preferred embodiment include artwork, post processing software, signal transmission, and patterning hardware. The imprinting process begins with an intended design. The first order artwork is manipulated to accommodate the viewing area and viewing conditions. Commercially available software, such as Adobe Photoshop or Illustrator, is used to conduct the manipulations based on viewing parameters. Inputs to this processing step account for such factors as viewing perspective. Adjustments are made to the size or scale of artwork to fit into the viewing area. The image may be viewed from audiences surrounding the turf on which it is imprinted by or it may be viewed from distinct positions. By rotating the art work patterning direction, i.e. the lay of the turf, one can optimize the viewing properties of the image for given perspectives (FIG. 2). Additional corrections can be skewed to compensate for such factors as parallax effects and keystoning. Skewing of the image or artwork can also reduce distortions caused by steep viewing angles. For example, artwork intended for still camera capture or telecast is intentionally distorted to provide the correct aspect ratio and keystone correction for the defined camera angle. Alternatively or additionally, contrast can be generated by changing the height of the turf (FIG. 3).

Computer generated artwork is further processed to provide a field-ready artwork data file. A computer program, such as tile mosaic design software used to generate tile layouts from picture files (http://www.mosaicdesigner.com/index.html), converts the ideal, baseline artwork into the closest approximation that can be implemented by the mechanical hardware. Final image processing is accomplished by software that creates pattern features. These features comprise the imprinted areas of contrasting detail that are produced by the patterning equipment. The full scale image is rendered using constraints defined by the patterning equipment. Contrast polarity of the image is established by assigning dark/light shading values. For example, negative or positive image contrast can be viewed by changing the viewing perspective by 180 degrees, i.e. light shaded detail can flip to dark detail. Optimization—software considers—the field's global position and angular orientation to predict the effect of the sun's path on the visual product. In this way, the viewing position contrast is optimized for the anticipated viewing period.

Field-ready artwork data files interact with a position tracking system to provide dynamic instructions for patterning. This is considered to be closed-loop control system which relies on position feedback. Post processing software, such as software used to provide computer numeric control (CNC) instructions to precision agriculture machinery (see http://www.trimble.com/ag_fieldprep.shtml), generates the machine command code. The code contains all of the instructions necessary for guiding and timing the operation of the patterning equipment. An equipment controller processes the machine code and coordinates patterning equipment operation with the patterning equipment location. The controller also coordinates instructional information that is supplied to the patterning equipment guidance and speed control mechanisms.

Mechanical functions of this patterning equipment include, for example, equipment speed and patterning actions. Guiding of the equipment along a prescribed path has a second order effect on the quality or precision of the field artwork. For a manually piloted process, instruction signals are generated by the equipment processor and displayed to an equipment operator on an on-board, visual display. The display provides guidance feedback information to the equipment operator to allow him to manage the equipment's path and speed. Automated guidance control uses signal processing and servo controls to adjust the equipment's steering system.

Application of Dyes and Chemicals

The velocity or speed of the equipment also has a second order effect on the quality of the imprinted image. Simple control methods can be used to establish the speed required for imprinting. These methods include, for example, operator actuated throttle, mechanical throttle, stop, or displacement/time based, cruising speed control.

Figure 4:
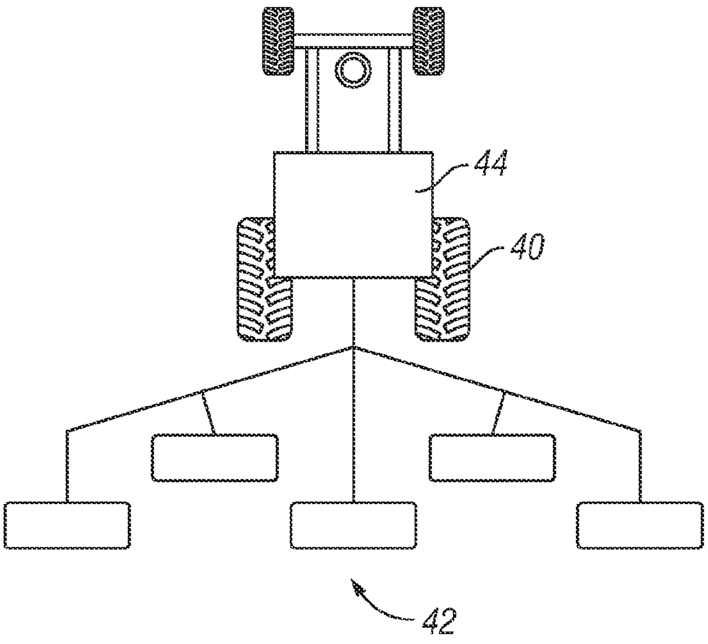
FIG. 4 is a top view of the patterning equipment showing use of a tractor for pulling the patterning implements according to the invention.

The imprinting system comprises a propulsion unit 40, a patterning mechanism 42, and control system 44 (FIG. 4). The propulsion unit provides velocity and translation control. The imprinting mechanism or implement includes the hardware for producing the imprinted information. The imprint format can comprise any of a dispensed chemical media or the use of physical patterning methods, such as cutting or bending of blades of grass within the turf.

Systems for changing the color or hue of turf employ technology developed for related effects, such as field painting and chemical fertilization. Dramatic image quality can be realized by dispensing variations of red, green, and blue. Here, standard dot matrix printing concepts and technology are scaled to larger dispensing systems, providing increased image quality and contrast over the cutting or bending methods described in this document. Painted images are produced with the same transport and control system described above. Liquid media are dispensed by media injectors located within the implement's delivery system. The mechanism's chemical injectors receive control signals which open and close mechanical valves. Individual valves control the amount and placement of media. In the case of colored imprinted imagery, a series of red, green, and blue (or cyan, magenta, and yellow, etc.) injector nozzles project a fan-type pattern; thus defining one pixel of an image matrix. A series of multi-color nozzles is spaced along the length of a spray bar to avoid gaps between the fan patterns, or pixels.

A variation of imprinting with colored media includes chemical based turf treatments that affect the chlorophyll or appearance of turf. This approach has long lasting effects compared to the relatively short term effects imparted by bending or mowing. For liquid chemical treatments, the delivery system is similar to the color media delivery system described above. A series of multiple nozzles can be used in a manner that is similar to that of the color application described above. In the case of a chemical treatment application, various chemicals can be applied preferentially. For example, turf health enhancing chemicals can be applied in zones or pixels to enhance the value of the green color in turf appearance at that location. Complementary chemicals can be applied to the turf at other locations that negatively affect the plant's chlorophyll, thus producing contrasting color attributes, such as pale green or other colors.

Powder or granular paint or chemical treatments can be applied with delivery systems that complement traditional systems that distribute conventional white lime product or fertilizers. For these systems, media wheel driven hoppers agitate and dispense the paint and/or chemicals through control gates that receive instruction signals from the system controller. In all applications, selected ratios of chemical treatments, or red, green, and blue color media are dispensed by the implement to produce the intended effect. The timing and duration of paint and/or chemical application are used to control the placement of imprint features.

Manipulation of Turf

Figure 5A:
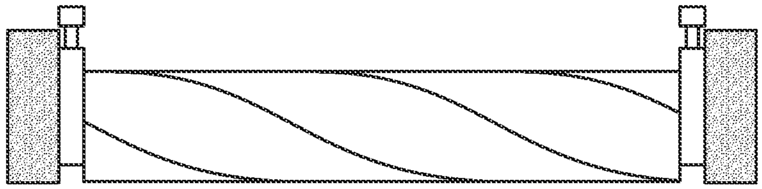
FIG. 5*a* is a front view of a mower type patterning implement showing an active element in a lowest position to create maximum pressure, turf blade angle, and viewing contrast according to the invention.
Figure 5B:
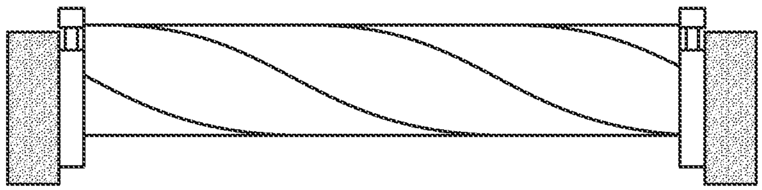
FIG. 5*b* is a front view of the patterning implement showing the active element in the highest position to create no pressure and thus produce a natural viewing contrast according to the invention.
Figure 5C:
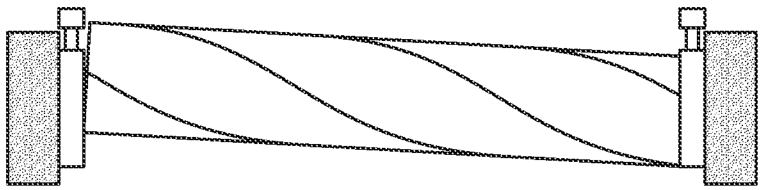
FIG. 5*c* is a front view of the patterning implement showing the active element at an angle which is used to create a gradient of contrast across the width of the implement according to the invention.

FIG. 3 shows an embodiment of the invention in which setting each blade to change the height of the turf changes the physical appearance of the turf. Additionally, color stratifications are exposed which yield contrast between those areas of turf having a different height. Imprinting hardware used to create deterministic length and area control can consist of traditional mowing implements that incorporate additional mechanical systems for producing desired height variations (FIG. 4). Such systems include, for example, actuators that raise and lower the implement's active element. An equipment control system sends control signals to such height position actuators. The actuators deliver the required force and control to raise and lower the active element to a determined position. See FIGS. 5*a*-5*c*, in which a cutter is lowered (FIG. 5*a*), raised (FIG. 5*b*), and skewed to produce a gradient (FIG. 5*c*). The resulting effect is an imprint pattern that is composed of specific heights of turf. The contrasting areas of tall and short turf affects the path and speed of rolling balls in sporting events, so this approach has limited applications.

Such applications include venues and locations where the effect of non-uniform field consistency does not affect the field's primary function.

Generating contrasting visual detail by arranging the refractive lay of the turf (FIG. 1) is also accomplished by deforming the blades of turf within the patterned area (FIG. 2). Deforming or bending processes are accomplished with a static shoe or brush, or with a dynamic rotating compressive roller or brush.

The control system described above executes the deterministic imprinting and patterning of images onto turf covered fields. In the preferred embodiment, the following elements (FIG. 6) and application thereof provide optimal resolution, contrast, and efficiency in achieving patterning of the turf. The patterning equipment's active element is an important component and is propelled by means of a machine described above (FIG. 4).

Figure 6:
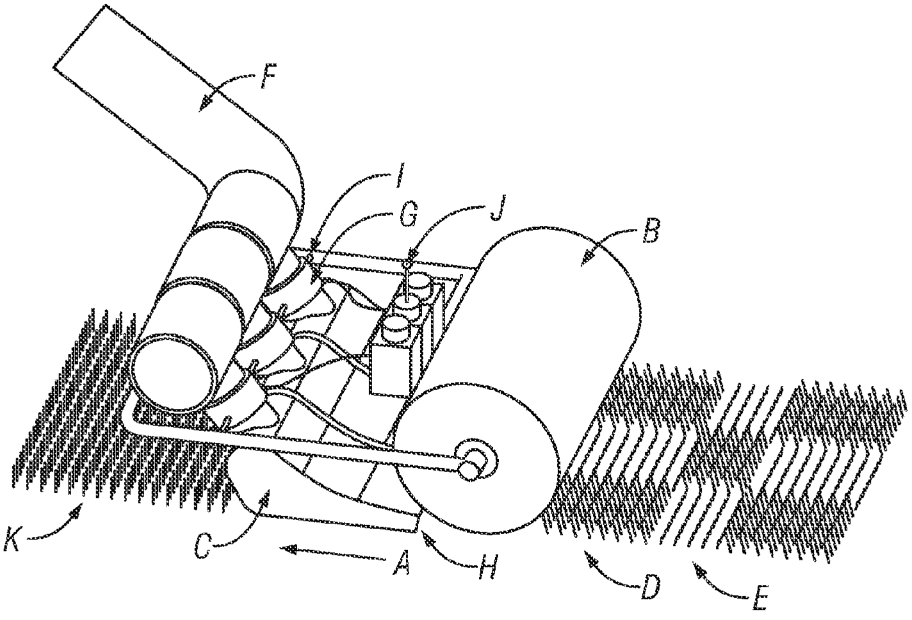
FIG. 6 is an isometric view of a triple roller type patterning matrix and the affect of such matrix on the turf according to the invention.

FIG. 6 shows an embodiment in which the patterning equipment's implement is a tool that produces variations in the refractive properties of the turf. The mechanism shown deforms or bends the turf in accordance with the command signals generated by the system controller (FIG. 4.) Uniquely, the invention provides a mechanism that dynamically deforms the turf in contrasting modes, i.e. opposing directions), while traveling in one direction (A). This unidirectional patterning capability and a high bandwidth patterning actuator response provide precise pattern registration and high throughput printing. Two key mechanical features of this embodiment of the invention include a load bearing roller (B) and pneumatic turf stuffer (C). The roller exerts pressure along its length to deliver pressure and thus stress the individual turf blades. The compressive stress folds the turf, producing a change in the angle of each blade in the turf at the location of greatest stress. The angle or lay of the turf is naturally arranged to point toward the directional path of the rolling system (E). The natural lay of this operation produces one mode of a two component contrast effect. The second contrast mode is produced by perturbing the turf to cause it to lay in the opposite direction of the moving roller (D). Blowing, or deforming the turf into the oncoming roller results in an unnatural lay, yielding the complementary contrast mode or contrast effect.

As shown in FIG. 6, the turf stuffing process is handled by a pneumatic system composed of an air source, ducting (F), a control valve (G), and a linear air delivery orifice (H). The air source is preferably an on-board system that supplies pneumatic pressure to the network of air delivery control valves. The delivery valves are slaved by actuators (I) that receive command signals through a receiver (J) from the system controller. Pneumatic pressure is delivered to discrete sections, thus providing segregated control to produce individual contrast effects along the length of the rolling system. The pneumatic pressure, or force, is delivered at a specific angle along the length of each section. The pressurized plenum and linear orifice work together to function as an air knife. The air knife efficiently generates sufficient force using a moderately powerful air source. The air knife orifice distance and angle are adjustable to accommodate different types of turf and field conditions. The combination of high velocity pneumatics and fast acting valves provide a high bandwidth for high definition imagery.

Figure 7A:
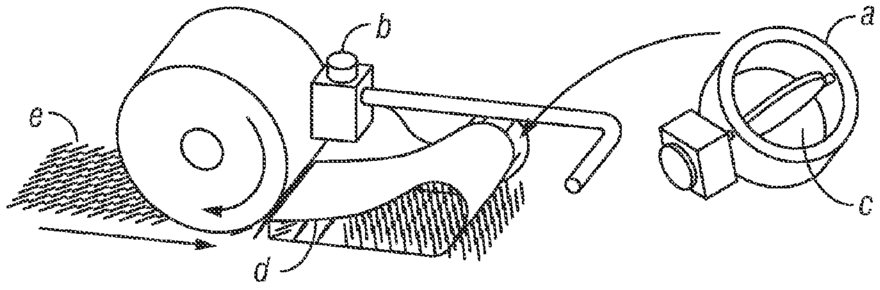
FIGS. 7*a* and 7*b* show a roller and pressurized air delivery mechanism for pre-positioning turf before rolling according to the invention.

FIG. 7*a* shows the air control valve (A) in a closed position, thus allowing the turf to be rolled in a natural direction. In operation, a command signal is received by the on-board processor (B) to close the flow valve butterfly (C). The closed valve blocks flow to the turf stuffer (D). The turf is pressed forward by the roller producing one mode of the two possible contrast modes (E).

Figure 7B:
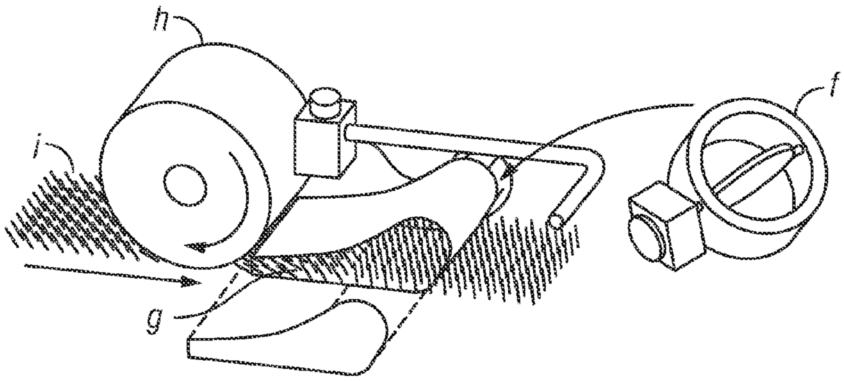

FIG. 7*b* shows the air control valve (F) in an open position, thus allowing pressurized air to enter the turf stuffer. In this case, the turf is blown rearward (G) towards the oncoming roller (H). The rear facing, flattened turf is trapped by the oncoming roller, thus producing a complementary contrast mode (I). This mode represents the unnatural rolled direction.

Figure 8:
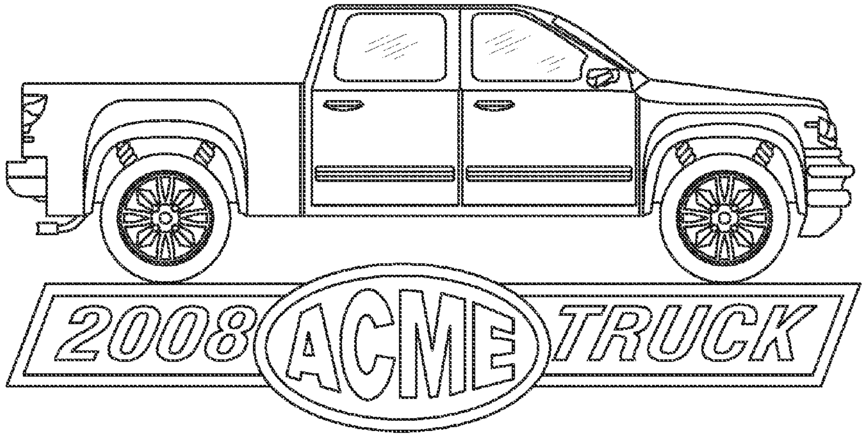
FIG. 8 shows an example of a field that has been altered according to the invention.
Figure 9:
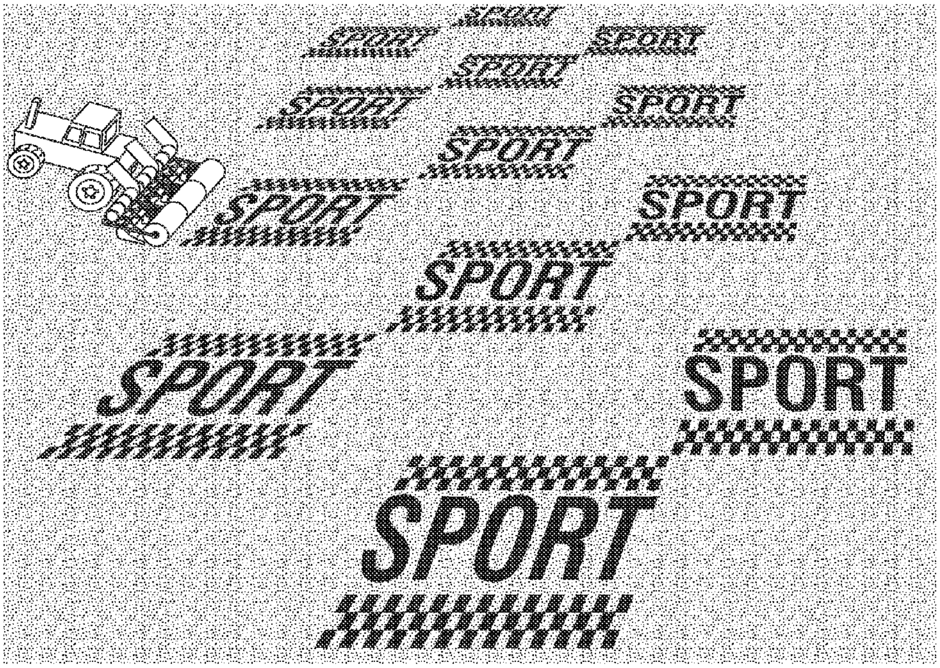
FIG. 9 is an isometric view showing an example of field artwork and equipment applied to a viewing area according to the invention.

FIGS. 8 and 9 show examples of fields that has been altered using the invention. FIG. 9 also shows the propulsion unit and patterning equipment shown in FIGS. 4 and 6.

Figure 10:
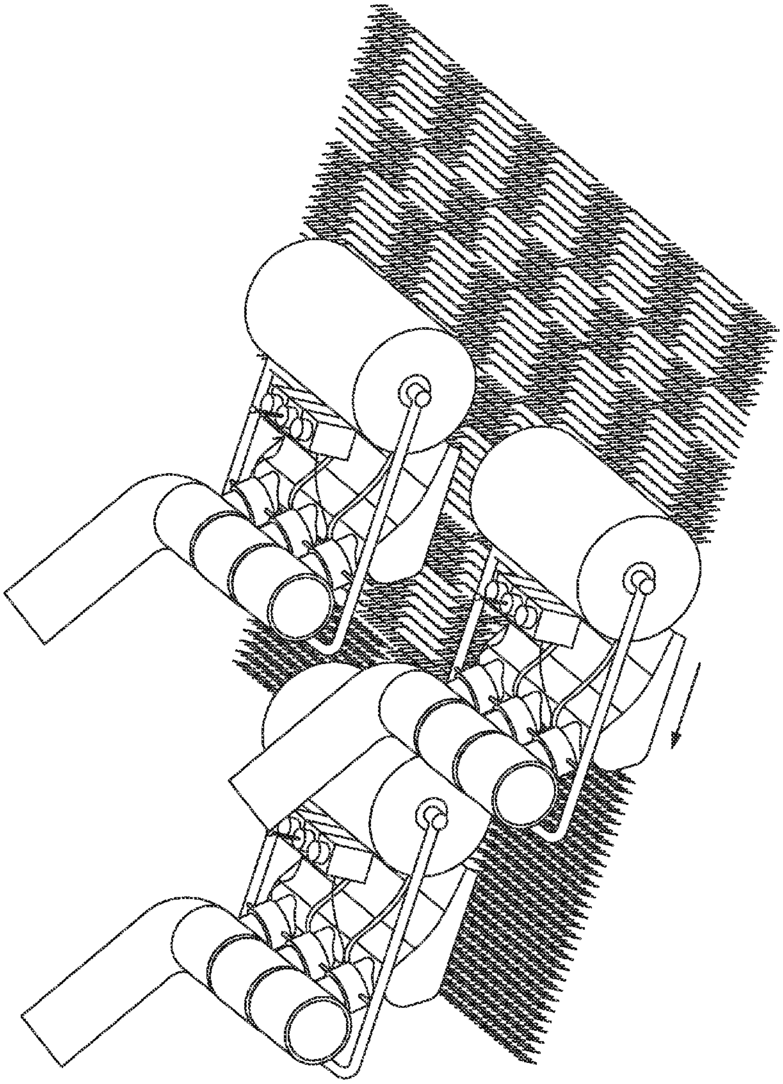
FIG. 10 is an isometric view of the patterning implement showing patterning direction and representative feature or contrast swaths according to this invention.

FIG. 10 is an isometric view of the patterning implement showing patterning direction and representative feature or contrast swaths. Here, a checkerboard pattern is created as the patterning equipment is moving from right to left.

Operation/Architecture

Figure 11:
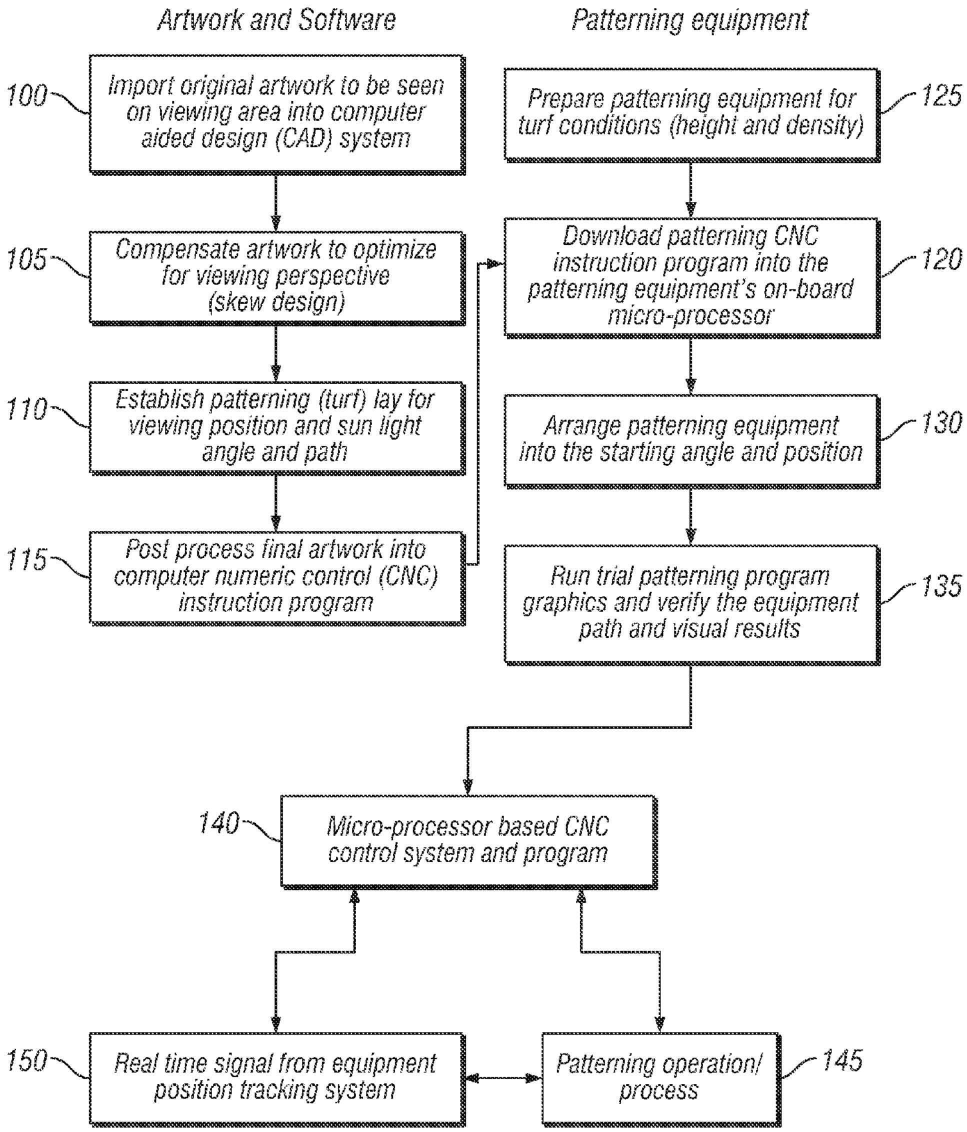
FIG. 11 is a block diagram/flow chart showing various actions that can be used to create a deterministic field pattern according to this invention.

FIG. 11 is a flow chart illustrating the relationship between artwork, software, and patterning equipment in a typical embodiment of the invention. In this embodiment, artwork is imported into a viewing area in a computer aided design program (100), for example [Pete: Give an example]. The design is then optimized for expected or typical viewing angles (105). The lay of the turf is established for expected or typical viewing position, sun light angles, and path (110) The processed design is then posted into a computer numeric control instruction program (CNC) or the like (115).

The patterning CNC instruction program is downloaded into the patterning equipment's on-board processor (120). Meanwhile, the patterning equipment has been prepared for the existing turf conditions (125). The patterning equipment is arranged into the starting angle and position (130). The trial patterning program graphics can be executed, as well as a verification of the equipment path and visual results (155).

The hardware and software, e.g. micro-processor based CNC control system and program (140), the position tracking system, e.g. real time signal from GPS (150), and the patterning operation and process (145) can function simultaneously to create the desired effect.

FIG. 11 represents the basic function of converting pictures into lawn art. Commercially available, specialized software, such as mosaic design software used to generate tile layouts from picture files (http://www.mosaicdesigner.com/index.html), converts pictures and graphics into field ready art files. The field ready art file is highly detailed and appears as it would on the field surface, for example, at approximately 100 feet from the viewer. The software can be used to scale the imported art work file and to section it into a grid of squares, with each square width being equal to the width of the individual pattering elements, preferably about 8 inches, but this size is not a requirement. For this example, the longitudinal dimension of each square is also equal to the width, thus producing a field ready image that is broken up into a grid of individual squares. The software uses approximation algorithms to assign light or dark contrast to each square within the field ready artwork grid. The light and dark contrast squares drive the patterning machine instruction output program.

Lawn Art—Baseline Patterning

Figure 12B:
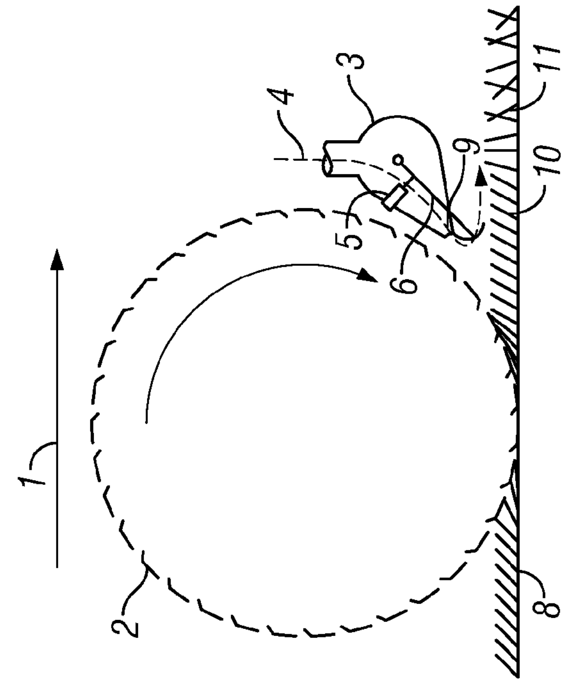
FIGS. 12A and 12B illustrate a process for generating two modes of contrast in one continuous pass operation according to this invention.
Figure 12A:
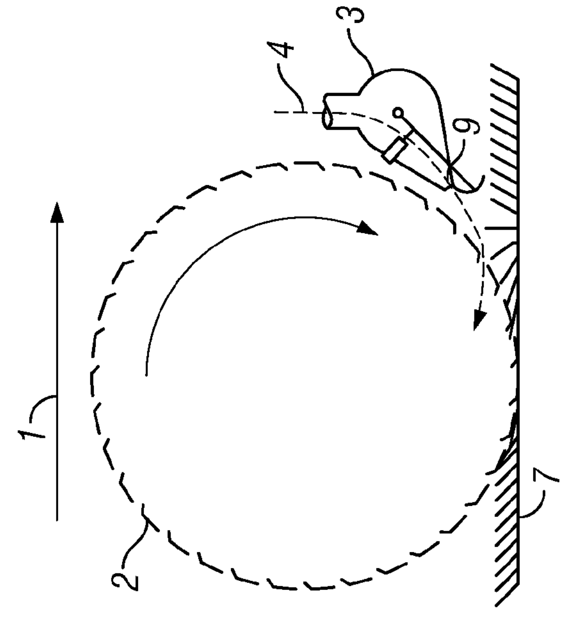

FIGS. 12A and 12B illustrate a process for generating two modes of contrast in one continuous pass operation 1. In this embodiment, a ventilated roller surface 2 has a plurality of apertures formed therethrough that allow air pressure to freely direct the lay of natural or artificial turf into the face of the oncoming roller without impedance. In a first mode of operation, a plenum 3 distributes compressed air 4 to a linear orifice 9 creating sufficient force to lay the turf into the direction of the oncoming roller (FIG. 12A). The result allows the compression of turf, thus creating an unnatural mode 7 of lay.

In a second mode of operations (FIG. 12B), a deflector or reverse thruster 6 is positioned with an actuator 5 into the air flow path allowing the roller to compress the turf in the natural (mode) direction 8. In this mode of operation, the reverse thruster redirects energy forward into the oncoming turf 10, thus promoting organization of the naturally random structure of turf 11 improving the natural mode contrast.

Accordingly, in this embodiment a fast acting actuator valve and deflector 5,6 provides precise control of modal contrast along the direction of roller travel. That is, the fast acting actuator valve is operable to controllably position said deflector at any desired location along a path between a first deflector position and a second deflector to provide precise control of modal contrast along the direction of roller travel.

It will be appreciated by those skilled in the art that the arrangement shown in FIGS. 12A and 12B is laterally duplicated to allow multiple channels of independent action. In such embodiment, patterning channels receive independent commands from a computer based control, as discussed above.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for precise and consistent lawn and field patterning, comprising:

a global positioning system;

a processor for generating a desired pattern, wherein said pattern is translated into patterning instructions;

a patterning implement for generating detailed patterns and for imprinting said pattern into turf patterns on any of natural or artificial lawns and fields, covered areas, and landscapes, said patterning implement comprising:

a plurality of independent printing mechanisms incorporated within said patterning implement, each of said independent printing mechanisms comprises:

a ventilated load bearing roller having a plurality of apertures formed therethrough that allow air pressure to freely direct a lay of natural or artificial turf into a face of said roller without impedance and which, when rolled over turf, imparts stress on blades of the turf such that said blades lay down in a predetermined direction when rolled over by said load bearing roller;

a pneumatic system comprising:

a source of compressed air;

a plenum for distributing compressed air from said source of compressed air to a linear orifice;

a deflector positionable relative to said linear orifice by an actuator into an air flow path between a first position that lays the turf into the direction of the oncoming roller by directing the air flow to allow compression of the turf in an unnatural mode of lay, and a second position that lays the turf in an opposite direction of the oncoming roller by directing to the air flow into the oncoming turf to allow the roller to compress the turf in a natural mode of lay;

wherein each of said independent printing mechanism is coupled to receive said patterning instructions from said processor and operate selectively in response thereto;

a guide mechanism for guiding said patterning implement to position it along a desired path at least in part with information from said global positioning system; and a control mechanism for individually controlling each of said independent printing mechanisms incorporated within said patterning implement responsive to said patterning instructions and in coordination with positioning of said patterning implement along said desired path.

2. The apparatus of claim 1, further comprising a patterning implement comprising a mechanism for any of:

bending individual blades of turf to create a desired change in refractive properties of the turf at specific locations to impart a pattern or image to the turf;

controlling the length of individual blades of the turf to expose color stratifications;

applying color altering media to the turf;

generating variations in pattern contrast to produce smooth gradients along a length of a patterned feature.

3. The apparatus of claim 1, wherein said patterning implement increases resolution of the pattern by varying contrast intensity across a width of an imprinted swath.

4. The apparatus of claim 1, said deflector further comprising:

a fast acting actuator valve to controllably position said deflector at any desired location along a path between said first deflector position and said second deflector to provide precise control of modal contrast along the direction of roller travel.

5. The apparatus of claim 1, said processor further comprising any of:

means for rendering said pattern to avoid loss of image quality through angular view distortion by skewing the pattern to enhance the pattern for optimal viewing from a defined viewing angle;

means for sequential control of said independent printing mechanisms incorporated within said patterning implement to provide a paced unveiling of the pattern; and means control of said independent printing mechanisms incorporated within said patterning implement to provide multiple pattern layers, wherein pattern components divided up and imprinted sequentially.

6. The apparatus of claim 5, said means for rendering further comprising:

means for applying aspect ratio and keystone correction to said pattern for a defined camera angle.

7. The apparatus of claim 1, wherein said pneumatic system is laterally duplicated to allow multiple, independent patterning channels.

8. The apparatus of claim 7, wherein said patterning channels receive independent commands from said control mechanism.

9. The apparatus of claim 1, said independent printing mechanisms incorporated within said patterning implement, further comprising:

means for perturbing turf to change its visual appearance.

10. An imprinting method for precise and consistent lawn and field patterning, comprising the computer and machine implemented steps of:

generating an intended pattern;

manipulating said pattern to accommodate a viewing area and viewing conditions for said pattern;

creating pattern features comprising imprinted areas of contrasting detail that are to be produced by patterning equipment;

rendering a full scale image of said pattern using constraints defined by said patterning equipment;

establishing contrast polarity of said pattern by assigning dark/light shading values;

using a compensation program to combine global position and angular orientation of said lawn or field to predict the effect of the sun's path on said pattern, wherein viewing position contrast is optimized for an anticipated viewing period;

generating field-ready artwork data files, wherein said files interact with a position tracking system to provide dynamic instructions for patterning;

generating machine command code instructions for guiding and timing operation of patterning equipment; and processing said machine command code with an equipment controller and coordinating said patterning equipment operation with a patterning equipment location, wherein said equipment controller also coordinates instructional information that is supplied to patterning equipment guidance and speed control mechanisms.

11. The method of claim 10, wherein patterning comprises a manually piloted process comprising the steps of:

generating instruction signals with said equipment processor; and displaying said instructions to an equipment operator on an on-board, visual display.

12. The method of claim 10, said pattern comprising a format which comprises any of a dispensed chemical media and physical patterning, wherein said physical patterning comprises any of cutting and bending blades of grass within said lawn or field.

13. The method of claim 12, said dispensed chemical media comprising:

means for changing any of the color and hue of said lawn or field, which means comprise any of field painting and chemical treatment.

14. The method of claim 13, said field painting comprising the step of:

dispensing variations of red, green, and blue paint.

15. The method of claim 10, further comprising the steps of:

providing media injectors located within a patterning equipment delivery system by dispensing liquid media;

providing control signals to said media injectors to selectively open and close individual mechanical valves;

wherein said individual mechanical valves control an amount and placement of patterning media.

16. The method of claim 15, further comprising the step of:

using said media injectors to project a fan-type pattern comprised of red, green, and blue, or cyan, magenta, and yellow, media;

wherein one pixel of a pattern of pixels is defined by each injection operation along a patterning path.

17. The method of claim 13, said chemical treatment step comprising the steps of:

preferentially applying chemicals in selected locations to enhance color in said locations; and preferentially applying complementary chemicals in other or overlapping selected locations to produce contrasting color attributes in said other or overlapping locations.

18. The method of claim 12, said dispensed chemical media comprising any of:

powder, granular paint, and chemical treatments; and further comprising the step of:

using wheel driven hoppers to agitate and dispense said powder, granular paint, and chemical treatments through control gates that receive control signals from said equipment controller.

19. The method of claim 12, said physical patterning comprising the step of:

altering each blade of grass or each group of blades of grass in said lawn or field to change the height of a lawn or field turf;

wherein physical appearance of the turf is changed.

20. The method of claim 19, said altering step comprising the step of:

exposing color stratifications to yield contrast between those areas of said turf having a different height.

21. The method of claim 19, said altering step comprising the step of:

using patterning equipment comprising a mowing implement to produce selected height variations in said turf;

said mowing equipment using height position actuators for any of raising, lowering, and skewing mowing implement active elements in response to control signals received from said equipment controller;

wherein a resulting pattern is comprised of specific heights of turf.

22. The method of claim 19, said altering step comprising the step of:

generating contrasting visual detail by arranging a refractive lay of the turf by deforming blades of turf within a patterned area.

23. The method of claim 22, said generating step further comprising the step of:

deforming or bending blades of turf with any of static shoe or brush, or a dynamic rotating compressive roller or brush.

24. An apparatus for patterning a lawn or field, comprising:

a tool for producing variations in refractive properties of a lawn or field turf by deforming or bending said turf in accordance with command signals generated by a system controller.

25. The apparatus of claim 24, said tool further comprising:

a mechanism for dynamically deforming or bending said turf in contrasting modes while traveling in one direction across said turf.

26. The apparatus of claim 24, said mechanism further comprising:

a load bearing roller; and a pneumatic turf stuffer;

wherein said roller exerts pressure along its length to deliver pressure and stress to individual turf blades;

wherein said compressive stress folds the turf, producing a change in an angle of each blade in the turf at a location of greatest stress.

27. The apparatus of claim 26, said mechanism comprising:

means for imparting a two component contrast effect to said turf by bending said turf in a direction of said roller and by perturbing said turf to cause it to lay in an opposite direction of said roller.

28. The apparatus of claim 27, said means for imparting further comprising:

means for selectively blowing or deforming said turf into an oncoming roller to produce an unnatural lay to said turf.

29. The apparatus of claim 28, said means for blowing or deforming further comprising:

a pneumatic system comprising an air source, at least one control valve, and an air delivery orifice;

at least one actuator for controlling said at least one control valve in response to command signals receive from a system controller;

wherein pneumatic pressure is delivered to discrete sections of said turf to provide segregated control to produce individual contrast effects along a length of a patterning track.

30. The apparatus of claim 26, said means for blowing or deforming further comprising:

an air knife for delivering pneumatic pressure at a specific angle along a patterning track.

31. The apparatus of claim 28, said means for blowing or deforming further comprising:

an air control valve operable in a closed position to allow said turf to be rolled in a natural direction and operable in an open position, to allow pressurized air to enter said turf stuffer, wherein said turf is blown towards said roller in an unnatural, rolled direction to produce a complementary contrast mode.

* * * * *